United States Patent
Kale et al.

(10) Patent No.: US 12,079,123 B2
(45) Date of Patent: *Sep. 3, 2024

(54) ADJUSTABLE GARBAGE COLLECTION SUSPENSION INTERVAL

(71) Applicant: Micron Technology, Inc., Boise, ID (US)

(72) Inventors: Poorna Kale, Folsom, CA (US); Christopher J. Bueb, Folsom, CA (US); Ashok Sahoo, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/094,549

(22) Filed: Jan. 9, 2023

(65) Prior Publication Data

US 2023/0161697 A1    May 25, 2023

Related U.S. Application Data

(63) Continuation of application No. 16/557,469, filed on Aug. 30, 2019, now Pat. No. 11,580,016.

(51) Int. Cl.
*G06F 12/02*    (2006.01)

(52) U.S. Cl.
CPC ...... *G06F 12/0253* (2013.01); *G06F 12/0246* (2013.01); *G06F 2212/7205* (2013.01)

(58) Field of Classification Search
CPC ............ G06F 12/0253; G06F 12/0246; G06F 2212/7205

USPC .......................................................... 707/813
See application file for complete search history.

(56) References Cited

U.S. PATENT DOCUMENTS

| | | | |
|---|---|---|---|
| 7,287,049 B1* | 10/2007 | Printezis | G06F 12/0253 |
| 7,672,983 B2* | 3/2010 | Printezis | G06F 9/4843 |
| | | | 718/100 |
| 7,996,642 B1 | 8/2011 | Smith | |
| 9,639,463 B1 | 5/2017 | Kankani et al. | |
| 9,690,700 B2 | 6/2017 | Choi et al. | |
| 10,628,298 B1 | 4/2020 | Chinthekindi et al. | |
| 10,747,663 B2* | 8/2020 | Yoshii | G06F 12/0253 |
| 2008/0059747 A1 | 3/2008 | Burckart et al. | |
| 2012/0159209 A1* | 6/2012 | Stemen | G06F 9/4893 |
| | | | 713/320 |
| 2012/0173809 A1* | 7/2012 | Ko | G06F 12/0893 |
| | | | 711/E12.001 |
| 2014/0281338 A1* | 9/2014 | Choi | G06F 3/0688 |
| | | | 711/170 |

(Continued)

FOREIGN PATENT DOCUMENTS

CN    105892941 A    *  8/2016
KR    20060098639 A       9/2006

*Primary Examiner* — Phuong Thao Cao
(74) *Attorney, Agent, or Firm* — Lowenstein Sandler LLP

(57) ABSTRACT

A host system can be queried to determine whether new data has been received based on a first time interval. After completion of the first time interval, a determination can be made as to whether the new data has been received and whether a portion of the new data was not stored. In response to the portion of the new data not being stored, the host system can be queried to determine whether subsequent data has been received based on a second time interval where the second time interval is different from first time interval.

20 Claims, 6 Drawing Sheets

(56) References Cited

U.S. PATENT DOCUMENTS

| | | |
|---|---|---|
| 2015/0100745 A1* | 4/2015 | Konda .................. G06F 3/0659 |
| | | 711/154 |
| 2015/0127623 A1 | 5/2015 | Gracie et al. |
| 2015/0261452 A1* | 9/2015 | Moon .................. G06F 3/0679 |
| | | 711/103 |
| 2015/0347025 A1 | 12/2015 | Law |
| 2015/0378622 A1* | 12/2015 | DeNeui .................. G06F 3/061 |
| | | 711/114 |
| 2016/0117102 A1 | 4/2016 | Hong et al. |
| 2016/0188208 A1 | 6/2016 | Kim et al. |
| 2016/0210060 A1 | 7/2016 | Dreyer |
| 2016/0239412 A1 | 8/2016 | Wada |
| 2016/0299689 A1* | 10/2016 | Kim ...................... G06F 3/0688 |
| 2016/0313943 A1 | 10/2016 | Hashimoto et al. |
| 2017/0068615 A1 | 3/2017 | Nagata |
| 2017/0075580 A1* | 3/2017 | Nagata ................ G06F 12/0246 |
| 2017/0102877 A1 | 4/2017 | Afriat |
| 2017/0123700 A1 | 5/2017 | Sinha et al. |
| 2017/0123718 A1 | 5/2017 | Sinha et al. |
| 2017/0123972 A1 | 5/2017 | Gopinath et al. |
| 2017/0235518 A1 | 8/2017 | Schatzl et al. |
| 2018/0276113 A1 | 9/2018 | Navon et al. |
| 2018/0307599 A1 | 10/2018 | Tamura |
| 2019/0042405 A1* | 2/2019 | Boyle ................ G06F 12/0246 |
| 2019/0227927 A1 | 7/2019 | Miao |
| 2019/0303289 A1* | 10/2019 | Yoshii ................ G06F 12/0246 |
| 2020/0034290 A1 | 1/2020 | Yasuda |
| 2020/0104254 A1 | 4/2020 | Lee |
| 2020/0218654 A1* | 7/2020 | Lee .................... G06F 12/0238 |
| 2020/0310956 A1 | 10/2020 | Kim et al. |
| 2020/0348957 A1 | 11/2020 | Krasner et al. |

\* cited by examiner

ADJUSTABLE GARBAGE COLLECTION SUSPENSION INTERVAL

CROSS REFERENCE TO RELATED APPLICATIONS

This application is a Continuation of, and claims priority to, U.S. patent application Ser. No. 16/557,469, filed on Aug. 30, 2019, which was issued as U.S. Pat. No. 11,580,016 on Feb. 14, 2023, the entire contents of which is incorporated herein by reference.

TECHNICAL FIELD

Embodiments of the disclosure relate generally to memory sub-systems, and more specifically, relate to an adjustable garbage collection suspension interval for a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
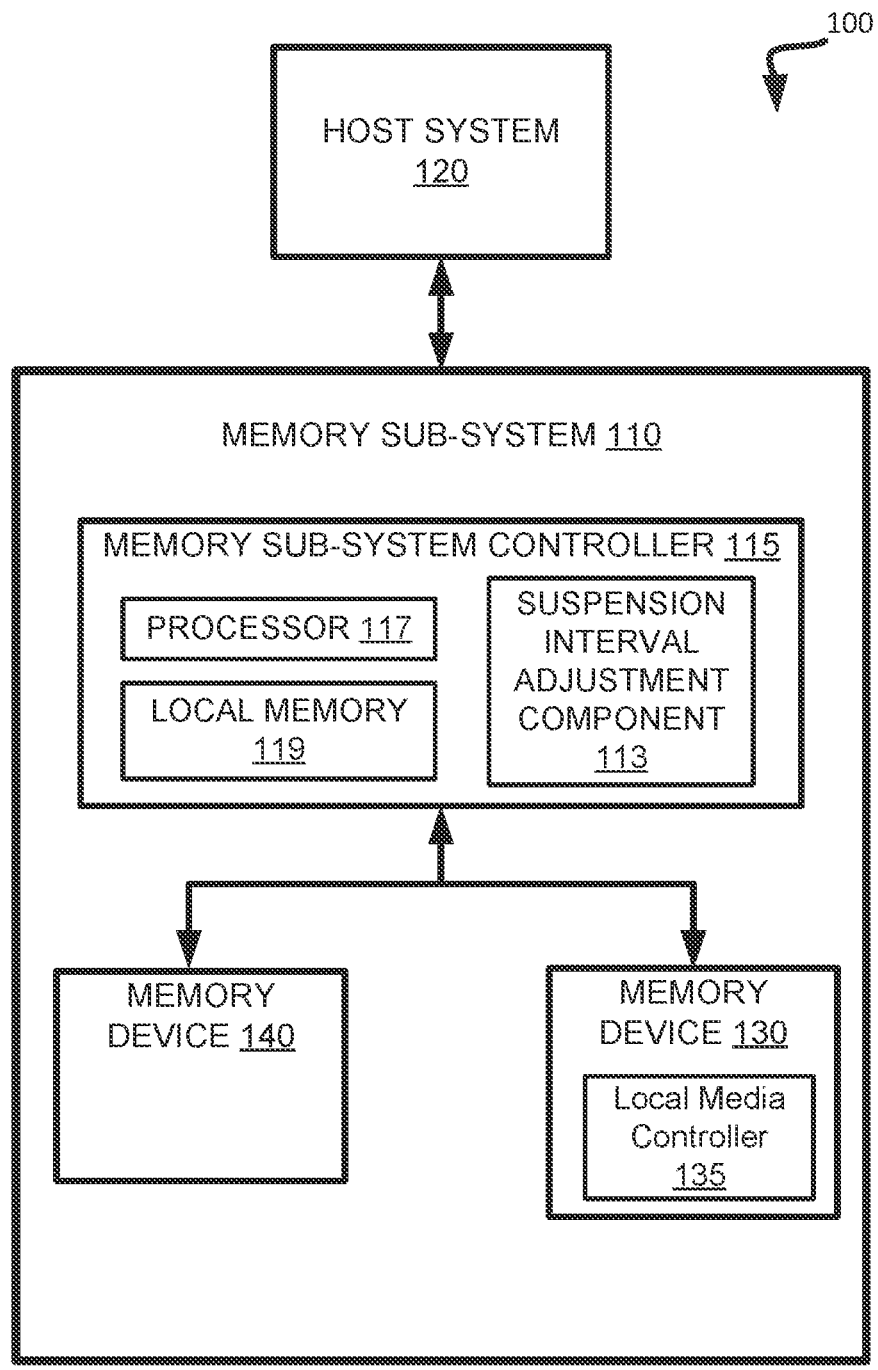
FIG. 1 illustrates an example computing environment that includes a memory sub-system in accordance with some embodiments of the present disclosure.

Aspects of the present disclosure are directed to an adjustable garbage collection suspension time. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data".

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A page of a block can contain valid data, invalid data, or no data. Invalid data is data that is marked as outdated as a new version of the data is stored on the memory device. Valid data is the most recent version of such data being stored on the memory device. A memory sub-system can mark data as invalid based on information received, for example, from an operating system.

A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and reused for write operations. Garbage collection is a set of operations that include, for example, selecting a block that contains valid and invalid data, selecting pages in the block that contain valid data, copying the valid data to new locations (e.g., free pages in another block), marking the data in the previously selected pages as invalid, and erasing the selected block.

The storing of data at a memory device can increase the wear of the memory device. After a threshold amount of write operations, the wear can cause the memory device to become unreliable so that data can no longer be reliably stored and retrieved from the memory device. At such a point, the memory sub-system can result in a failure when any of the memory devices fails. Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others.

An example of a host system is a surveillance system or a recording device of a surveillance system. In a number of memory sub-system applications, such as surveillance video, every video frame captured can be important and therefore needs to be stored at the memory sub-system. A frame drop-less system is a system that can store each video frame without losing any of the video frames captured by a recording device. Conventional memory sub-systems use a series of data bursts each followed by an idle period during which background media management operations, such as garbage collection and wear leveling, can occur. Therefore, at certain intervals, herein referred to as the garbage collection suspension interval, background operations, such media management operations, should cease for the memory sub-system to determine if the host system (e.g., the recording device) has sent, or is about to send, new data (e.g., host data) to the memory sub-system. If no new data is to be received then the background operations can continue. If new data is about to be received then the background operations can be suspended while the memory sub-system receives and stores the new data.

Conventionally, the garbage collection suspension interval is a static value that cannot be adjusted according to a specific usage of the memory sub-system. However, if the garbage collection suspension interval is too large or too small then the memory sub-system can drop frames. If the garbage collection interval is too large then the background operations continue to execute as new data is received. Thus, frames can be lost because the memory sub-system cannot store all of the frames of the new data as the new data is being received concurrently with the background operations being performed. On the other hand, if the garbage collection suspension interval is too small, then memory sub-system can utilize an excessive amount of time to repeatedly determine if new data is received. In such a case, the background operations do not execute for enough time so that buffer blocks of the memory sub-system can become full in which case frames can also be lost. Buffer blocks can be blocks of the memory sub-component in which incoming data frames are temporarily stored before transferring the data frames to other blocks of the memory sub-system for longer term storage. Frames of the new data can be lost (e.g., not stored) if the buffer blocks of the memory sub-system are storing previously received data that has not yet been transferred to other blocks by the background operations.

Aspects of the present disclosure address the above and other deficiencies by having a memory sub-system that can adjust a garbage collection suspension interval. The garbage collection suspension interval can be adjusted to prevent frame drops in a number of different use cases and for any host system using the memory sub-system. In one example, a host system, such as a surveillance camera, can store frames at a memory sub-system by using one garbage collection suspension interval and can determine if frames are dropped as the host system is generating new frames to be stored at the memory sub-system. If frames are dropped then the host system can adjust the garbage collection suspension interval and attempt to store subsequent frames at the memory sub-system. The host system can repeat this process until the garbage collection suspension interval is optimized. In another example, the memory sub-system can determine that frames are being dropped at the current garbage collection suspension interval. The memory sub-system can then periodically adjust the garbage collection suspension interval until no frames received from the host system are dropped.

Advantages of the present disclosure include, but are not limited to, enabling frame drop-less systems for a wide variety of use cases or applications as the garbage collection suspension interval can be adjusted as the host system generates and sends new data to the memory sub-system at different rates based on the use case or application. In addition, the optimized garbage collection suspension interval can result in more efficient performance of the background operations to maximize available buffer blocks and spare blocks that can be used to receive and temporarily store host data and to avoid frame drops. As a result, the performance of the memory sub-system can be improved so that new data can be stored at the memory sub-system without losing any frames.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. An example of a host system 120 is a surveillance system or a recording device (e.g., camera) of a surveillance system, high speed recording devices, action/sport cameras, etc. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs), multi-level cells (MLCs), triple level cells (TLCs), or quad-level cells (QLCs). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory devices 130 are managed memory devices, which is a raw memory device combined with a local controller (e.g., the local media controller 135) for memory management within the same memory device package.

The memory sub-system 110 includes a suspension interval adjustment component 113 that can be used to adjust a garbage collection suspension interval. In some embodiments, the controller 115 includes at least a portion of the suspension interval adjustment component 113. For example, the controller 115 can include a processor 117 (processing device) configured to execute instructions stored in local memory 119 for performing the operations described herein. In some embodiments, the suspension interval adjustment component 113 is part of the host system 120, an application, or an operating system.

The suspension interval adjustment component 113 can suspend a garbage collection operation periodically at completion of a suspension interval. The suspension interval adjustment component 113 can determine during the suspension of the garbage collection operation whether data has or is about to be received from a host system. The suspension interval adjustment component 113 can determine if any of the received data was dropped. The suspension interval adjustment component 113 can adjust the suspension interval if any of the received data was dropped. Further details with regards to the operations of the suspension interval adjustment component 113 are described below.

Figure 2:
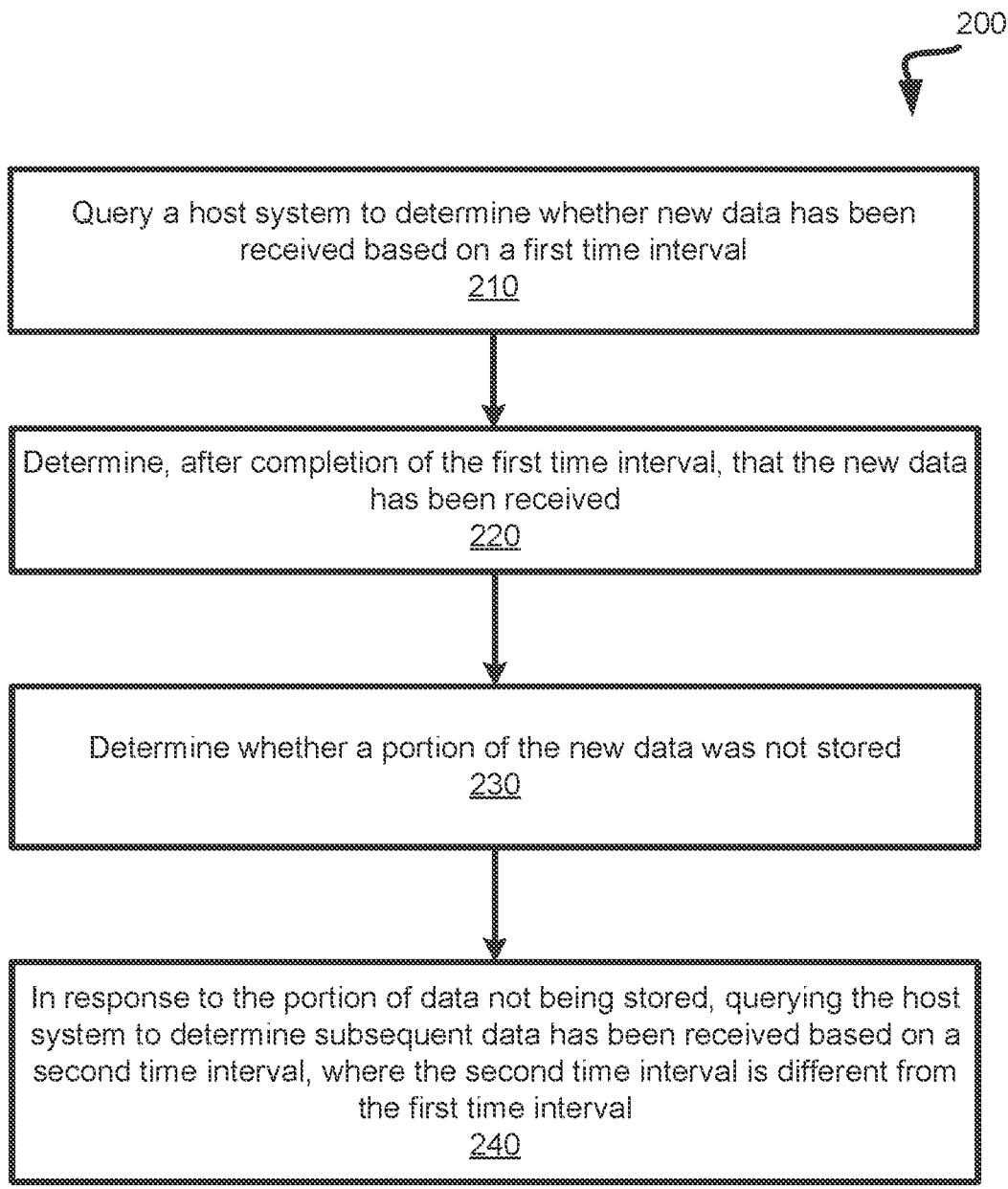
FIG. 2 is a flow diagram of an example method to adjust a garbage collection suspension interval, in accordance with some embodiments of the present disclosure.

FIG. 2 is a flow diagram of an example method 200 to adjust a garbage collection suspension interval, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the suspension interval adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device queries a host system to determine whether new data has been received based on a first time interval. To query the host system, the processing device can stop a garbage collection operation temporarily and then determine if the host system has sent, or is about to send, new data to the memory sub-system. For example, the host system can transmit data to the memory sub-system in bursts. A burst can be a series of consecutive write operations from the host system to write data at the memory sub-system followed by a period of no write operations being transmitted from the host system. After a burst of data is received, the processing device can begin a garbage collection operation until the next burst of new data is received. In order to suspend the garbage collection operation at the proper time to receive the new data, the processing device can stop the garbage collection operation after the first time interval to query the host system. The first time interval can be an amount of time that the processing device waits between queries of the host system. In one example, after the first time interval, the processing device queries the host system to determine whether new data is received. If no new data is received then the processing device waits until the first time interval elapses again before querying the host system. The processing device can continue to query the host system at completion of the first time interval until new data is received, or is about to be received from the host system. The host system can include some form of memory buffer that stores up to a threshold amount of data. Once the memory buffer is full, or at a specified interval, the data in the memory buffer can be transmitted to the memory sub-system for storage. When the processing device queries the host system, the host system can indicate to the processing device that it will transmit data (the memory buffer will be full, or an interval will elapse) in some amount of time. Thus, the processing device can determine whether new data is about to be received by determining whether the host system indicated that it would transmit data within some defined period of time.

The processing device can determine the completion of the time interval using a timer (e.g., a countdown timer). For example, at the completion of a garbage collection operation (e.g., a read, program, erase, etc.) the processing device can determine if the timer has finished. If the timer has finished at the end of the operation then the processing device can query the host system (unless other circumstances as described with respect to FIGS. 3 and 4 indicate otherwise). If the timer has finished while the operation is being performed, then the processing device can query the host system after completion of the operation.

At operation 220, the processing device determines, after completion of the first time interval, that the new data has been received. New data can be received in bursts of data. Each new burst of data can include one or more video frames. When new data is received it can be temporarily stored in a buffer block, or an overprovisioned block, of a memory component of the memory sub-system. The data can then be transferred from the buffer blocks to other blocks of the memory sub-system for longer term storage.

At operation 230, the processing device determines whether a portion of the new data was not stored (i.e., dropped). A portion of the new data can be dropped if the new data is received before completion of the garbage collection suspension interval. When the data is received before the completion of the garbage collection suspension interval the garbage collection process continues rather than being suspended so the memory sub-system can be unable to store the newly received data. In addition, new data can be dropped if the buffer blocks are full (or if there are an insufficient number of available buffer blocks) and the new data cannot be temporarily stored in the buffer blocks. The buffer blocks can be full, or limited, if the garbage collection suspension interval is very small and the garbage collection operation does not have enough time to clear a sufficient number of the buffer blocks. In addition, the processing device can determine that garbage collection operations need to be performed to prevent loss of critical data even though new data is received from the host system.

At operation 240, the processing device, in response to the portion of data not being stored (i.e., dropped), queries the host system to determine whether subsequent data has been received based on a second time interval, where the second time interval is different form the first time interval. When the processing device determines that a portion of new data is dropped, the processing device can indicate that the garbage collection suspension interval should be adjusted. In one example, the garbage collection suspension interval can be too small and thus the data is dropped because the buffer blocks are full, or that the processing device determines that garbage collection operations must be performed at the time new data is received. In this case, the garbage collection suspension interval can be increased by a defined amount. Alternatively, the garbage collection suspension interval can be increased by an amount proportional to the amount of data that was dropped. In another example, the garbage collection suspension interval can be too large and thus the data is dropped because garbage collection is not suspended when new data is received. In this case, the garbage collection suspension interval can be decreased by a defined amount. Alternatively, the garbage collection suspension interval can be decreased proportionally to the amount of data that was dropped. Once the garbage collection suspension interval is adjusted to a second time interval, the processing device can then query the host system at completion of the second time interval rather than the first time interval.

Figure 3:
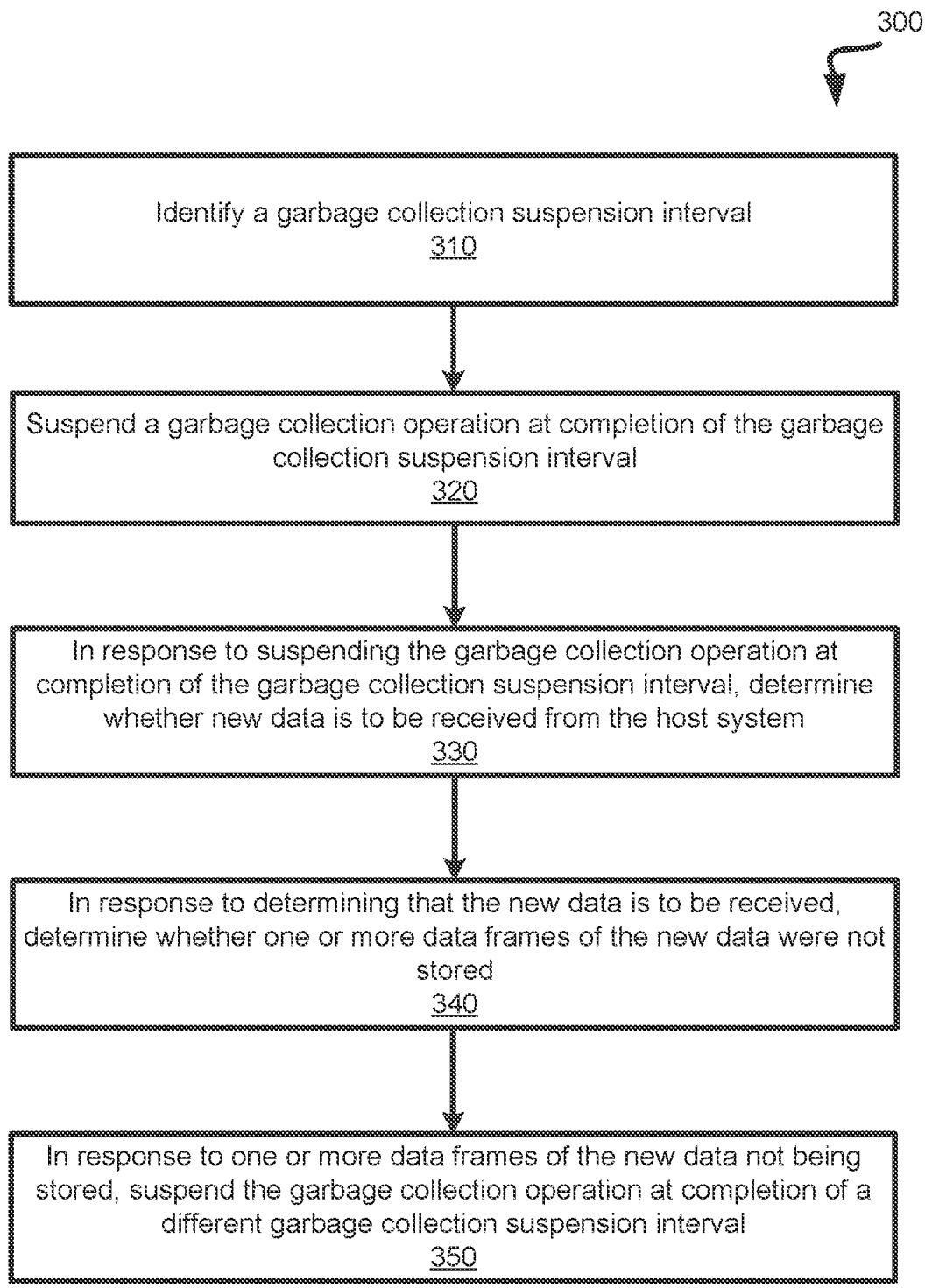
FIG. 3 is a flow diagram of an example method to adjust a garbage collection suspension interval based on frame drops, in accordance with some embodiments of the present disclosure.

FIG. 3 is a flow diagram of an example method 300 to adjust a garbage collection suspension interval, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the suspension interval adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device identifies a garbage collection suspension interval. The garbage collection suspension interval can be a specified period of time between garbage collection suspensions during which the processing device is to determine whether new data is received from a host system. The garbage collection suspension interval can be adjusted by the processing device or the host system. Identifying the garbage collection suspension interval can include retrieving the garbage collection suspension interval from a data structure stored at a memory component of the memory sub-system.

At operation 320, the processing device suspends a garbage collection operation at completion of the garbage collection suspension interval. Each time the garbage collection suspension interval elapses, the processing device can issue a command to suspend garbage collection and to query the host system to determine if new data is about to be sent to the memory sub-system from the host system. The processing device can suspend garbage collection or other background operations to provide sufficient bandwidth for the processing device to receive and store data sent from the host system.

The processing device can determine that the garbage collection interval has elapsed using a timer (e.g., a countdown timer). At expiration of the timer the processing device can then query the host system. However, in some instances the timer can expire either during execution of a garbage collection operation or during a period of execution in which it would be more beneficial to complete one or more additional operations before querying the host system (e.g., only one or two more pages to program before completion of a larger transfer function that includes a significant number of pages). Generally, if pausing the background operations would require saving large amounts of information or data then it can be more efficient to complete the background operations before suspending the background operations and querying the host system and then resuming the background operations at a later time (e.g., a program/ write operation that is halfway done). In one example, if the transfer function (moving valid data from one block to another) performed by the background operations corresponds to copying and writing a large amount of data from a number of blocks to new blocks, then the transfer function can be allowed to complete if most or a threshold amount of the data has already been copied to the new blocks. In another example, a background operation can be a sub-operation of the garbage collection operation (e.g., a copy, erase, program, etc.). If the background operation (sub-operation) is executing at the time the time interval elapses then the processing device can complete execution of the sub-operation and then suspend the garbage collection operation. If at completion of an operation the timer has elapsed, then the processing device can suspend background operations and query the host system to determine if new data will be received.

At operation 330, the processing device, in response to suspending the garbage collection operation at completion of the garbage collection suspension interval, determines whether new data is to be received from the host system. To determine whether new data is to be received from the host system, the processing device can send a query to the host system. The query can request a response from the host system indicating whether the host system is sending new data within a predefined period of time (e.g., within the next few milliseconds, within the next second, or other period of time).

At operation 340, the processing device, in response to determining that new data is to be received, determines whether one or more data frames of the new data were dropped. The processing device can track when data frames are dropped. The processing device can increment a counter each time that it determines that a data frame has been dropped. To determine that a data frame has been dropped, the processing device can identify metadata associated with the new data indicating frame count. Therefore, if fewer frames are stored than are indicated by the frame count then frames were dropped. Alternatively, the host system can determine if, and how many, frames were dropped. For example, the memory sub-system can send an indication of how many frames were stored and the host system can then determine if fewer frames were stored than were transmitted.

At operation 350, the processing device, in response to one or more data frames of the new data being dropped, suspends the garbage collection operation at completion of a different garbage collection suspension interval. If one or more data frames of the new data are dropped, then the garbage collection suspension interval may be too large or too small. If too large, the processing device can drop frames because background operations such as garbage collection continued to execute while the data frames were received at the memory sub-system. Therefore, the frames can be dropped because not enough bandwidth was available at the memory sub-system to store the data frames. Alternatively, if the garbage collection suspension interval is too small then the background operations will be suspended too frequently to allow for sufficient garbage collection of the blocks of the memory sub-system. Thus, buffer blocks and over-provisioned blocks can become unavailable and new data frames cannot be stored.

In one example, in addition or alternatively to determining that data frames are dropped, the processing device can monitor the number of buffer blocks and overprovisioned (spare) blocks of memory sub-system. If the number of buffer blocks drops below a certain threshold then the processing device can determine that data frames are likely to be dropped and indicate to the host system that the garbage collection suspension time should be adjusted.

Figure 4:
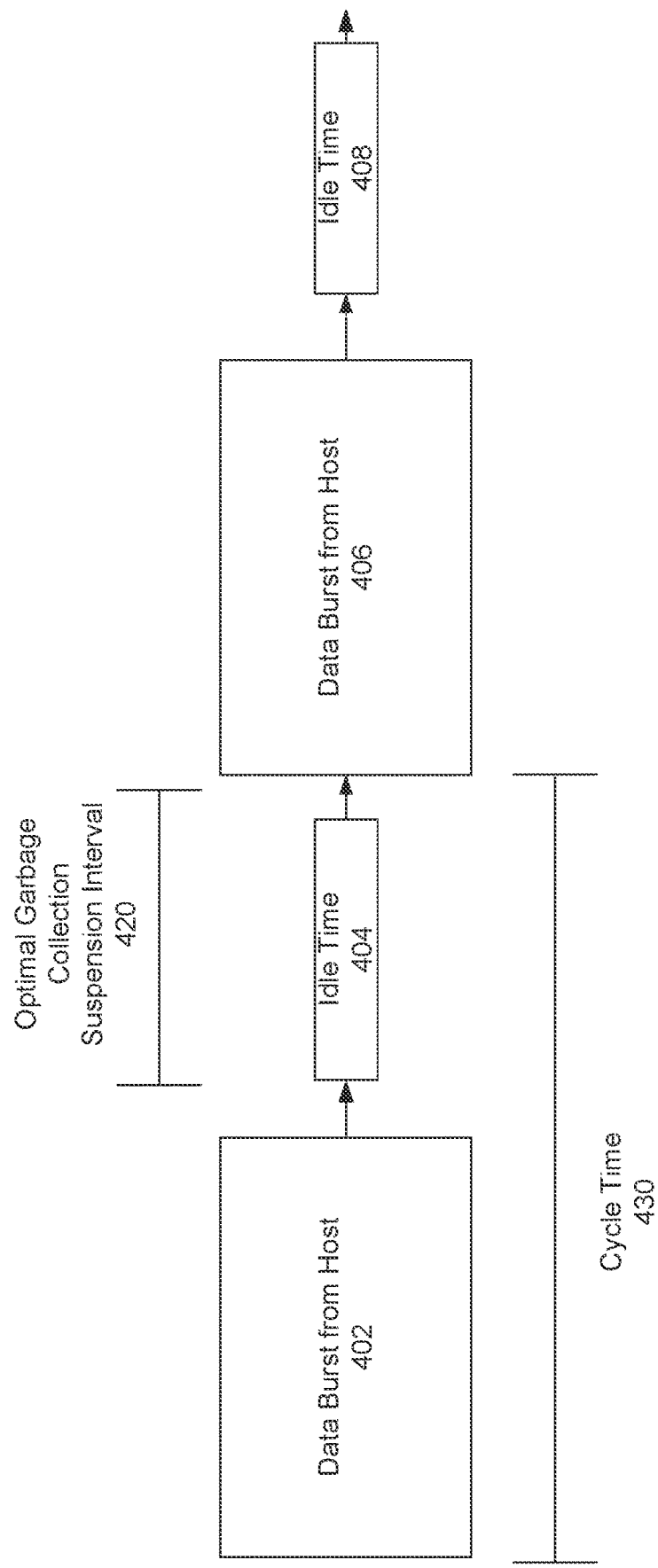
FIG. 4 illustrates an example of determining an optimal garbage collection suspension interval, in accordance with some embodiments of the present disclosure.

FIG. 4 depicts an illustrative example of an optimal garbage collection suspension interval while receiving data at a memory component from a host system. The host system can send data to the memory sub-system in data bursts (e.g., data burst 402 and 406). Between data bursts the memory sub-system can perform background operations, such as garbage collection, during idle times (e.g., idle time 404 and 408) to manage and consolidate data in the memory sub-system. Garbage collection can help to free up blocks to which new data can be written. To help switch between garbage collection and receiving and storing data, every so often the memory sub-system can suspend garbage collection to determine whether new data is about to be received from the host system. If new data is to be received then the garbage collection operation remains suspended while the data is received and stored. Otherwise, if new data is not received then the memory sub-system returns to performing garbage collection operations. The period of time between suspending garbage collection can be referred to as a garbage collection suspension interval.

In one example, to prevent data frames from being lost during a data burst, the garbage collection suspension interval can be selected to provide sufficient time for garbage collection operations to be performed but without overlapping with data bursts from the host system. An adjustable garbage collection suspension interval can be updated during operating until an optimal garbage collection suspension interval 420 is achieved. The optimal garbage collection suspension interval 420 can be an interval in which no data frames are dropped by the memory sub-system. In one example, the optimal garbage collection suspension interval 420 is the largest possible interval that causes zero frames to be dropped. This can be because a higher interval provides for lower write amplification (the number of rewrites caused by low over-provisioning during garbage collection) and higher OP, while a lower interval can reduce storage capacity and increase write amplification. The optimal garbage collection suspension interval 420 can be different for different host systems (e.g., surveillance cameras, sports cameras, and other such video frame recording devices) and for different settings of a device because different device can accumulate different amounts of data and therefore have different cycle times 430 (e.g., the time over which a data burst and idle time last before the next data burst). Additionally, although FIG. 4 depicts the optimal garbage collection suspension interval 420 as elapsing once over idle time 404, it should be noted that any number of optimal garbage collection suspension intervals 420 can be selected as long as no data frames are dropped.

In one example, the host system can adjust the garbage collection suspension time in response to frames being dropped. For example, the host system can begin by specifying a large garbage collection suspension time (e.g., the first garbage collection suspension time) and allow the memory sub-system to run for a length of time. After the length of time, the host system can receive an indication as to whether frames were dropped. If so, then the host system can reduce the garbage collection suspension time (e.g., the different garbage collection suspension time). The host system can again allow the memory sub-system to run and determine if frames are dropped. In this way, the host system can iteratively adjust the garbage collection suspension time until there are not frames dropped while the memory sub-system is used to store data.

In another example, more than one optimal garbage collection suspension intervals for multiple different usage cases (e.g., different video resolutions) can be defined for the memory sub-system. Therefore, the host system operating characteristics can be adjusted in the field and an optimal garbage collection suspension interval can be associated with the selected operating characteristics. In some embodiments, the operating characteristics can be used to determine a number of frames that are generated over a defined period of time as well as a data size of the frames. The optimal garbage collection interval can then be different based on the number of frames and the data size of the frames. For example, an optimal garbage collection interval for a camera at high resolution can be 100 ms, while the optimal garbage collection interval for the same camera at low resolution can be 250 ms.

Figure 5A:
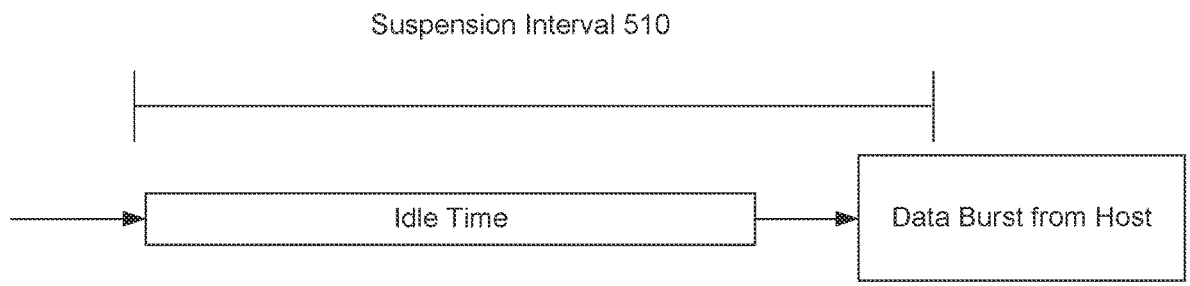
FIGS. 5A, 5B and 5C illustrate potential suspension intervals and potential adjustments of the suspension interval, in accordance with some embodiments of the present disclosure.
Figure 5B:
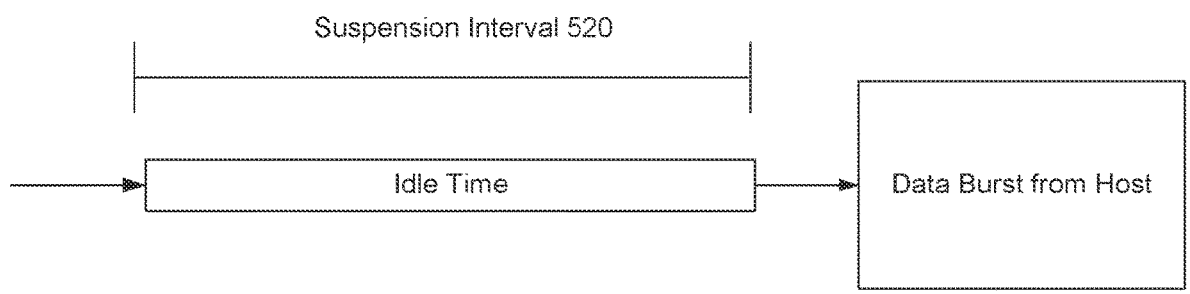
Figure 5C:
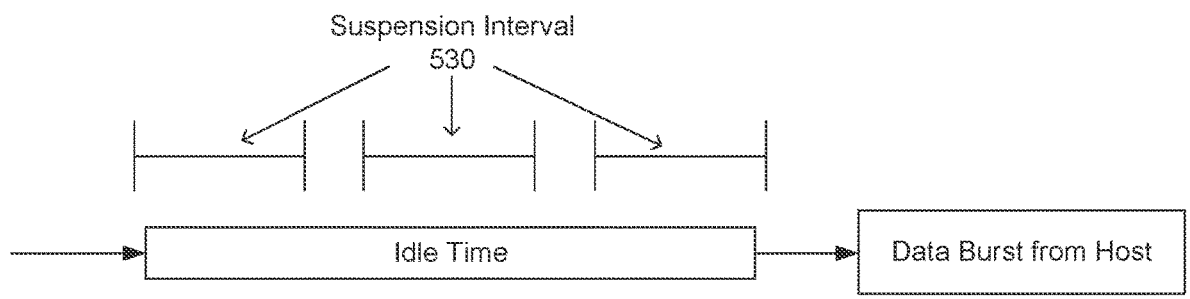

FIGS. 5A, 5B, and 5C each depict an example garbage collection suspension interval for determining whether to suspend garbage collection to receive new data. An adjustable garbage collection suspension interval can be used to determine and select a garbage collection suspension interval that provides for a frame drop-less system. An interval should be selected that is shorter than idle time so that garbage collection does not overlap with a data burst and a long enough interval so that garbage collection is not suspended too many times reducing the time garbage collection can be performed.

Referring to FIG. 5A the suspension interval 510 is longer than the idle time and thus overlaps with the data burst from the host system. In this example, the memory sub-system doesn't suspend garbage collection until the data burst is already being received and thus the data frames received prior to suspension of garbage collection can be dropped due to insufficient bandwidth.

Referring to FIG. 5B the suspension interval 520 is similar to the idle time of the host system and therefore is a good candidate for an optimal garbage collection suspension interval. The memory sub-system can therefore suspend garbage collection near the end of the idle time of the host system and determine that new data from the host system is about to be received. The garbage collection operation is also not suspended more than necessary and thus a maximum amount of time is allowed for garbage collection and other background operations.

Referring to FIG. 5C the suspension interval 530 is substantially smaller than the idle time of the host system. In some instances, a smaller suspension interval such as suspension interval 530 can prevent data frames from being dropped. However, in some instances, the suspension interval 530 can cause date frames to be dropped. When garbage collection is suspended to query the host system, that time can be wasted and thus garbage collection of the memory sub-system can fall behind. For example, between each suspension interval 530 there is a period of time that garbage collection is not occurring (e.g., two in this case). Therefore, buffer blocks and overprovisioning of the memory sub-system can be occupied rather than free for new incoming data. In such a case, data frames can be dropped.

Figure 6:
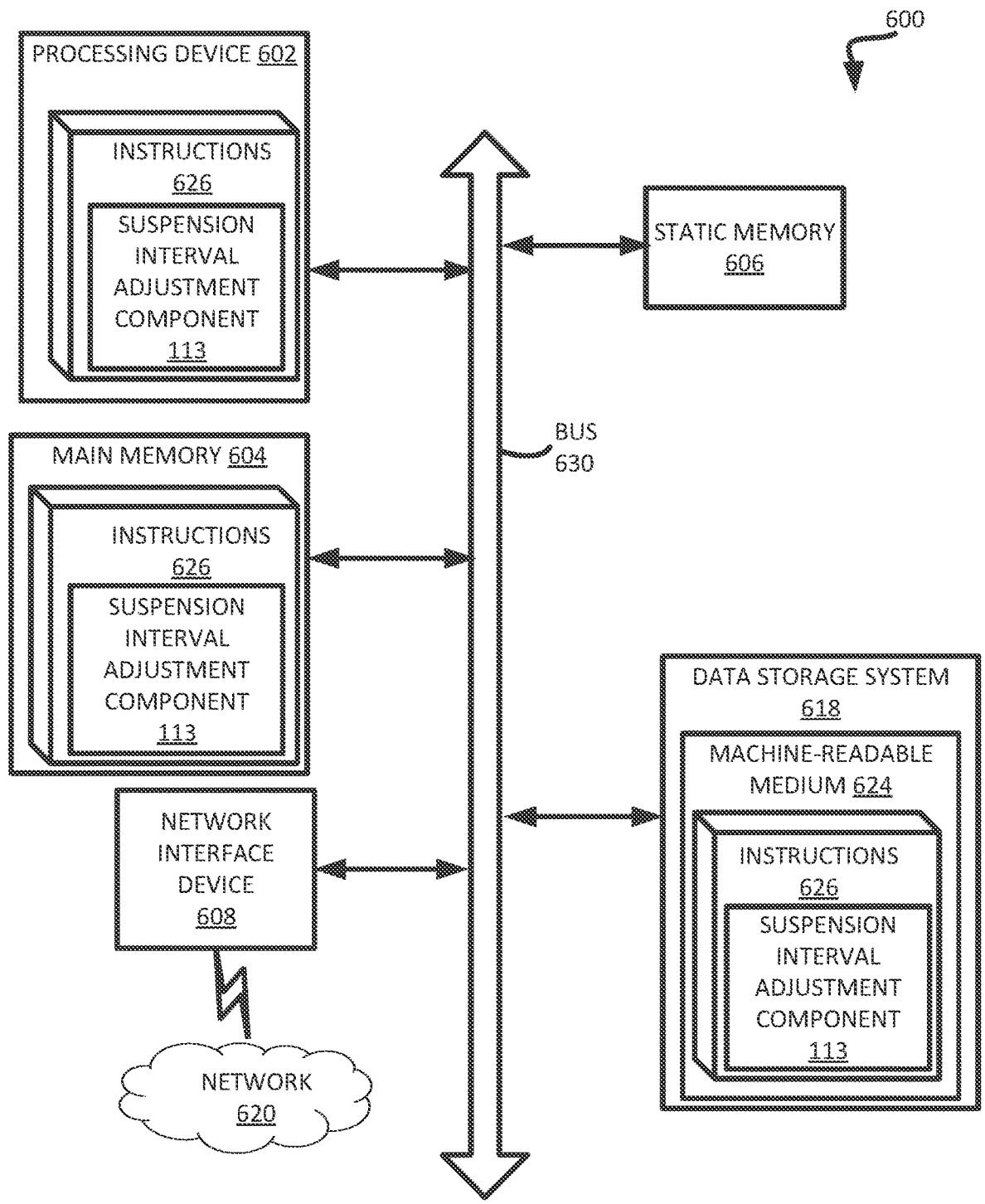
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the suspension interval adjustment component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a suspension interval adjustment component (e.g., the suspension interval adjustment component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
suspending, by a processing device of a memory sub-system, a first garbage collection operation at completion of an initial garbage collection suspension interval;
determining, based on operations of a host system, whether new data is to be received from the host system within a threshold period of time;
in response to determining that the new data is to be received within the threshold period of time, adjusting the initial garbage collection suspension interval to form an adjusted garbage suspension interval; and
suspending a second garbage collection operation at completion of the adjusted garbage collection suspension interval.

2. The method of claim 1, further comprising:
in response to determining that no new data is to be received from the host system, resuming the suspended second garbage collection operation.

3. The method of claim 1, wherein the adjusted garbage collection suspension interval is smaller than the initial garbage collection suspension interval.

4. The method of claim 1, further comprising:
adjusting the initial garbage collection suspension interval by a defined amount to obtain the adjusted garbage collection suspension interval.

5. The method of claim 1, further comprising:
adjusting the initial garbage collection suspension interval by an amount in proportion to a number of data frames in the new data to obtain the adjusted garbage collection suspension interval.

6. The method of claim 1, wherein determining that the new data is to be received within the threshold period of time further comprises:
receiving the new data from the host system; and
determining whether each frame of the new data was stored.

7. A system comprising:
a memory device; and
a processing device, operatively coupled to the memory device, to perform operations comprising:
suspending a first garbage collection operation at completion of an initial garbage collection suspension interval;
determining, based on operations of a host system, whether new data is to be received from the host system within a threshold period of time;
in response to determining that the new data is to be received within the threshold period of time, adjusting the initial garbage collection suspension interval to form an adjusted garbage suspension interval; and
suspending a second garbage collection operation at completion of the adjusted garbage collection suspension interval.

8. The system of claim 7, wherein the operations further comprise:
in response to determining that no new data is to be received from the host system, resuming the suspended second garbage collection operation.

9. The system of claim 7, wherein the adjusted garbage collection suspension interval is smaller than the initial garbage collection suspension interval.

10. The system of claim 7, wherein the operations further comprise:
adjusting the initial garbage collection suspension interval by a defined amount to obtain the adjusted garbage collection suspension interval.

11. The system of claim 7, wherein the operations further comprise:
adjusting the initial garbage collection suspension interval by an amount in proportion to a number of data frames in the new data to obtain the adjusted garbage collection suspension interval.

12. The system of claim 7, wherein determining that the new data is to be received within the threshold period of time further comprises:
receiving the new data from the host system; and
determining whether each frame of the new data was stored.

13. The system of claim 11, wherein the data frames in the new data correspond to video frames.

14. A non-transitory computer-readable storage medium comprising instructions that, when executed by a processing device of a memory sub-system, cause the processing device to perform operations comprising:
suspending a first garbage collection operation at completion of an initial garbage collection suspension interval;
determining, based on operations of a host system, whether new data is to be received from the host system within a threshold period of time;
in response to determining that the new data is to be received within the threshold period of time, adjusting the initial garbage collection suspension interval to form an adjusted garbage suspension interval; and
suspending a second garbage collection operation at completion of the adjusted garbage collection suspension interval.

15. The non-transitory computer-readable storage medium of claim 14, wherein the operations further comprise:
in response to determining that no new data is to be received from the host system, resuming the suspended second garbage collection operation.

16. The non-transitory computer-readable storage medium of claim 14, wherein the adjusted garbage collection suspension interval is smaller than the initial garbage collection suspension interval.

17. The non-transitory computer-readable storage medium of claim 14, wherein the operations further comprise:
adjusting the initial garbage collection suspension interval by a defined amount to obtain the adjusted garbage collection suspension interval.

18. The non-transitory computer-readable storage medium of claim 14, wherein the operations further comprise:
adjusting the initial garbage collection suspension interval by an amount in proportion to a number of data frames in the new data to obtain the adjusted garbage collection suspension interval.

19. The non-transitory computer-readable storage medium of claim 14, wherein determining that the new data is to be received within the threshold period of time further comprises:
receiving the new data from the host system; and
determining whether each frame of the new data was stored.

20. The non-transitory computer-readable storage medium of claim 18, wherein the data frames in the new data correspond to video frames.

* * * * *